US009386326B2

(12) United States Patent
Noru et al.

(10) Patent No.: US 9,386,326 B2
(45) Date of Patent: Jul. 5, 2016

(54) VIDEO DECODING ERROR CONCEALMENT TECHNIQUES

(71) Applicant: Nvidia Corporation, Santa Clara, CA (US)

(72) Inventors: Krishna Kishor Noru, San Jose, CA (US); Nitin Jadon, Burhanpur (IN); Shu-Jen Fang, Miaoli County (TW); Prahlad Venkatapuram, San Jose, CA (US); Visalakshi Vaduganathan, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 311 days.

(21) Appl. No.: 13/646,127

(22) Filed: Oct. 5, 2012

(65) Prior Publication Data

US 2014/0098898 A1    Apr. 10, 2014

(51) Int. Cl.

| H04N 7/68 | (2006.01) |
| H04N 19/895 | (2014.01) |
| H04N 19/139 | (2014.01) |
| H04N 19/176 | (2014.01) |
| H04N 19/102 | (2014.01) |
| H04N 19/16 | (2014.01) |

(52) U.S. Cl.
CPC .......... *H04N 19/895* (2014.11); *H04N 19/102* (2014.11); *H04N 19/139* (2014.11); *H04N 19/16* (2014.11); *H04N 19/176* (2014.11)

(58) Field of Classification Search
CPC .............. H04N 7/68; H04N 19/00933; H04N 19/00939; H04N 19/139; H04N 19/176; H04N 19/16; H04N 19/895; H04N 19/102

USPC ...................................................... 375/240.27
See application file for complete search history.

(56) References Cited

U.S. PATENT DOCUMENTS

| 5,084,791 A | 1/1992 | Thanos et al. |
| 5,576,765 A | 11/1996 | Cheney et al. |
| 5,585,931 A | 12/1996 | Juri et al. |
| 5,598,222 A | 1/1997 | Lane |
| 5,818,529 A | 10/1998 | Asamura et al. |
| 5,848,194 A | 12/1998 | Ishizuka et al. |
| 5,990,812 A | 11/1999 | Bakhmutsky |
| 6,008,745 A | 12/1999 | Zandi et al. |
| 6,028,635 A | 2/2000 | Owen et al. |
| 6,041,403 A | 3/2000 | Parker et al. |
| 6,046,773 A | 4/2000 | Martens et al. |
| 6,047,357 A | 4/2000 | Bannon et al. |

(Continued)

OTHER PUBLICATIONS

IBM; Reducing the Power Dissipation of Processors on Large CMOS Chips; IBM Technical Disclosure Bulletin; vol. 36, Issue 7; pp. 405-406; Jul. 1993.

*Primary Examiner* — Jay Patel
*Assistant Examiner* — Francis G Geroleo

(57) ABSTRACT

Techniques for synchronizing error concealment during video decoding include determining a decoding error. A recovery point within a current frame is determined for each decoding error. The determined recovery point may be the start of the next good slice of a frame after the current frame containing the error. The number of macroblock to be concealed is also determined. The determined number of macroblocks from the recovery point may then be concealed in hardware or software. The techniques for concealing errors may also include determining available macroblocks for use in concealing the error. The techniques for concealing errors may further include selecting a given concealment mode.

16 Claims, 11 Drawing Sheets

(56) References Cited

U.S. PATENT DOCUMENTS

| | | | |
|---|---|---|---|
| 6,259,479 | B1 | 7/2001 | Gadre et al. |
| 6,381,282 | B1 * | 4/2002 | Kwan et al. ............... 375/240.27 |
| 6,535,642 | B1 | 3/2003 | De Bonet |
| 6,543,023 | B2 | 4/2003 | Bessios |
| 6,675,282 | B2 | 1/2004 | Hum et al. |
| 6,839,624 | B1 | 1/2005 | Beesley et al. |
| 6,915,263 | B1 | 7/2005 | Chen et al. |
| 6,992,605 | B2 | 1/2006 | Kadono et al. |
| 7,142,225 | B1 | 11/2006 | Boler et al. |
| 7,209,643 | B2 | 4/2007 | Sato et al. |
| 7,224,837 | B2 | 5/2007 | Olshansky et al. |
| 7,236,525 | B2 | 6/2007 | Pearson |
| 7,239,662 | B2 | 7/2007 | Horowitz et al. |
| 7,324,026 | B2 | 1/2008 | Puri et al. |
| 7,327,791 | B1 * | 2/2008 | Sekiguchi et al. ....... 375/240.27 |
| 7,418,380 | B2 | 8/2008 | Chen et al. |
| 7,590,059 | B2 | 9/2009 | Gordon |
| 7,605,725 | B2 | 10/2009 | Puri et al. |
| 7,929,776 | B2 * | 4/2011 | Sethi et al. .................... 382/232 |
| 2001/0005399 | A1 * | 6/2001 | Kimoto .................... 375/240.27 |
| 2001/0030615 | A1 | 10/2001 | Zhou |
| 2002/0114397 | A1 * | 8/2002 | Todo et al. ............... 375/240.29 |
| 2003/0012286 | A1 * | 1/2003 | Ishtiaq et al. ............ 375/240.27 |
| 2003/0131030 | A1 | 7/2003 | Sebot et al. |
| 2004/0081245 | A1 | 4/2004 | Deeley et al. |
| 2004/0155968 | A1 | 8/2004 | Cheatle et al. |
| 2005/0117653 | A1 | 6/2005 | Sankaran |
| 2005/0123057 | A1 | 6/2005 | MacInnis et al. |
| 2005/0254584 | A1 * | 11/2005 | Kim et al. ................ 375/240.27 |
| 2005/0259688 | A1 | 11/2005 | Gordon |
| 2006/0064560 | A1 | 3/2006 | Mizuno et al. |
| 2006/0071829 | A1 | 4/2006 | Pearlstein et al. |
| 2006/0143669 | A1 | 6/2006 | Cohen |
| 2006/0215930 | A1 | 9/2006 | Terui |
| 2006/0227883 | A1 | 10/2006 | Citro |
| 2006/0282737 | A1 * | 12/2006 | Shi et al. ....................... 714/746 |
| 2007/0014367 | A1 | 1/2007 | Zhou |
| 2008/0005736 | A1 | 1/2008 | Apacible et al. |
| 2008/0080623 | A1 * | 4/2008 | Kim et al. ................ 375/240.27 |
| 2008/0218387 | A1 | 9/2008 | Chang et al. |
| 2009/0060056 | A1 * | 3/2009 | Zhang ..................... 375/240.27 |
| 2009/0213938 | A1 * | 8/2009 | Lee et al. ................ 375/240.24 |
| 2010/0040153 | A1 * | 2/2010 | Imanaka et al. .......... 375/240.27 |
| 2010/0142623 | A1 * | 6/2010 | Vaduganathan et al. . 375/240.25 |

\* cited by examiner data from a top neighbor macroblock relative to a current macroblock may be loaded into a row buffer, while data from a left neighbor macroblock is loaded into a column buffer. It is determined if a top neighbor macroblock and a left neighbor macroblock of a current macroblock are valid to use for concealing the current macroblock having an error. The current macroblock having an error is concealed based upon the available neighbor macroblocks. The current macroblock may be concealed using the valid data in one or more of the plurality of buffers.

VIDEO DECODING ERROR CONCEALMENT TECHNIQUES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing systems is video encoding and decoding. Video encoding is utilized to compress the video for storage and/or transmission. Compressing the video reduces the amount of memory for storing the video and the amount of transmission bandwidth for sending and receiving the video. The compressed video may then be decoded to view the video.

During decoding, errors may occur in the elementary (decompressed) data stream. A decoder should be able to handle error scenarios so that the elementary stream can be played at the desired frame rate. One conventional technique to handle errors is for decoder hardware to generate an interrupt to applicable software, such as a driver, utility, routine, or the like. In response to the interrupt, the software reads the hardware status, identifies the error, and tries to conceal the error. However, based techniques can introduce undesired latency which may prevent operation at a desired minimum frame rate. Accordingly, there is a continuing need for improved decoder error concealment techniques.

SUMMARY OF THE INVENTION

The present technology may best be understood by referring to the following description and accompanying drawings that are used to illustrate embodiments of the present technology directed toward techniques for selecting a mode of video decoding error concealment and appropriately concealing them.

In one embodiment, a method of concealing errors during decoding of a compressed video stream starts when an error is detected. The recovery point within the current frame is determined and a number of macroblocks to be concealed are determined. The recovery point may be a next good slice of the frame. The number of macroblocks to be concealed may include the number of macroblocks containing an error and a predetermined number of macroblocks before the one or more macroblocks containing errors. The determined number of macroblocks from the recovery point may then be concealed in hardware or software.

In another embodiment, a hardware decoder may include a syntax parser engine, an error detection engine, a macroblock level information construction engine communicatively coupled together. The error detection engine may detect an error during decoding a current frame of video data. The syntax parser engine determines a recovery point with the current frame when an error is detected. The error detection engine determines a number of macroblocks to be concealed when an error is detected. The macroblock level information construction engine thereafter conceals the number of macroblocks from the determined recovery point.

In another embodiment, a method of concealing errors during decoding of a compressed video stream starts when an error is detected. In the course of detecting error, macroblock data may be loaded into a plurality of buffers. For example, In another embodiment, a hardware decoder may include a syntax parser engine, an error detection engine, a macroblock level information construction engine communicatively coupled together. The error detection engine detects an error during decoding a current frame of video data. The syntax parser engine determines if a top neighbor macroblock and a left neighbor macroblock of a current macroblock are valid to use for concealing the current macroblock having an error. The macroblock level information construction engine then conceals the current macroblock having the error based upon the available neighbor macroblocks.

In another embodiment, a method of concealing errors during decoding of a compressed video stream starts when an error is detected. The method determines if a macroblock is to be concealed by software. The macroblock determined to include an error, is concealed in software if so determined. If the error is not to be concealed in software, it is determined if a concealment motion vector is described in a compression specification. If the concealment motion vector is described in the specification, the macroblock is concealed using the motion vector described in the compression specification. If the concealment motion vector is not described in the specification, it is determined if the current frame is a field frame and the error is in a second field of the frame. If the error is in the second field of the frame, the macroblock is concealed by copying pixel data from the first field of the frame. If the error is not in the second field of the frame, it is determined if one or more neighbor motion vectors are available. If one or more neighbor motion vectors are available, a motion vector is derived from the one or more available neighbor motion vectors and the macroblock is concealed using the derived motion vector. If the one or more neighbor motion vectors are not available, it is determined if a reference frame is available for prediction. If the reference frame is available for prediction, the macroblock is concealed by copying pixel data from the same region in the prediction frame. Otherwise, the macroblock determined to include an error is concealed utilizing neighboring pixel values, if the reference frame is not available for prediction.

In another embodiment, a hardware decoder may include a syntax parser engine, an error detection engine, and a macroblock level information construction engine communicatively coupled together. The error detection engine is adapted to detect an error during decoding a current frame of video data. The syntax parser engine is adapted to determine if an erroneous region of the image is to be concealed by software, to determine if a concealment motion vector is described in a compression specification if the error is not to be concealed in software, to determine if the current frame is a field frame and the error is in a second field of the frame if the concealment motion vector is not described in the specification, to determine if one or more neighbor motion vectors are available if the error is not in the second field of the frame, and to determine if a reference frame is available for prediction, if the one or more neighbor motion vectors are not available. The macroblock level information construction engine is adapted to sequentially select one of the following concealment methods: 1) concealing in software the region of the image whose data was lost due to the error with a predetermined value, if the error is to be concealed in software; 2) concealing the region of the image whose data was lost using the concealment motion vector described in the compression specification, if the concealment motion vector is described in the specification; 3) concealing the region of the image whose data was lost by copying pixel data from the first field of the frame, if the error is in the second field of the frame; 4) deriving a motion vector from the one or more available neighbor motion vectors and concealing the region of the image whose data was lost using the derived motion vector, if one or more neighbor motion vectors are available; 5) concealing the region of the image whose data was lost by copying pixel data from a same region in the prediction frame, if the reference frame is available for prediction; or 6) concealing the region of the image whose data was lost utilizing neighboring pixel values, if the reference frame is not available for prediction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
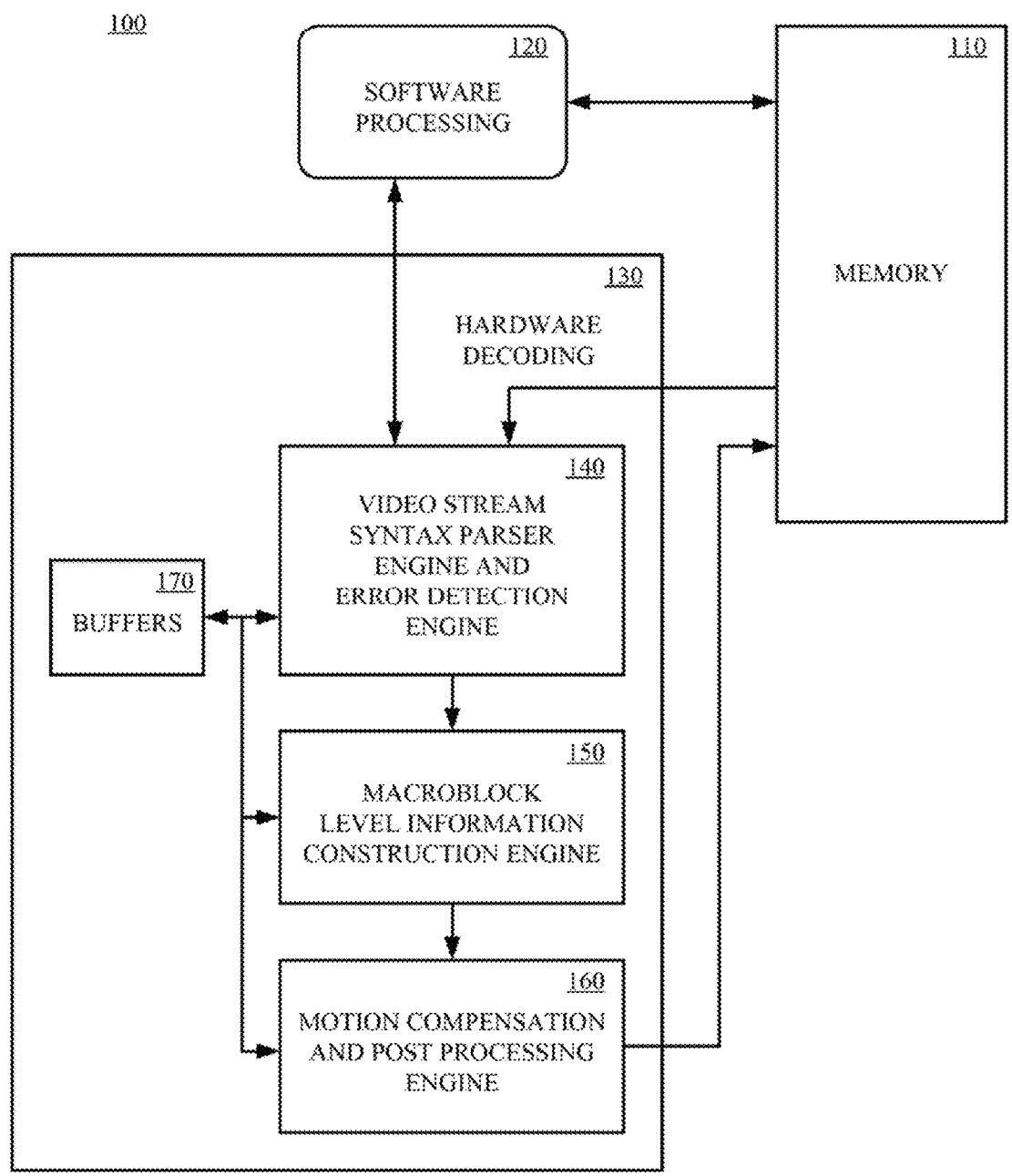
FIG. 1 shows a block diagram of a video decoder, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring now to FIG. 1, a video decoder, in accordance with one embodiment of the present technology, is shown. The video decoder 100 may be implemented in a computer, CD/DVD/Blu-ray player, set top box (STB), or the like. The video decoder may also be implemented with a video encoder. In one implementation, the video decoder is a MPEG decoder. The video decoder includes computing device readable media (e.g., memory) 110, software processing unit 120 and hardware decoding unit 130. The software processing may be implemented by computing device-executable instructions (e.g., computer program) that are stored in computing device-readable media (e.g., computer memory) and executed by a computing device (e.g., processor). In one implementation the software processing may be performed by one or more routines, drivers, utilities and/or the like executing under control of an operating system running on a central processing unit (CPU), graphics processing unit (GPU) or combination thereof.

The hardware decoding typically includes a video stream syntax parser engine and error detection engine 140, a macroblock level information construction engine 150 and a motion compensation and post processing engine 160. It is appreciated that the hardware decoding may include additional engines. Furthermore, it is appreciated that the functions of one or more described engines may be combined with other functions into other engines or may be further divided out into separate engines. The described organization is only representative of a typical logical organization and numerous other organizations of the functions performed by the hardware decoding are possible. The video stream syntax parser engine, under control of one or more programs (e.g., operating system and user mode application), fetches compressed video stream data from the memory. The video stream syntax parser engine parses the compressed data stream to determine the start of data frames, the type of data frames (e.g., intra (I), predicted (P), or bidirectional (B) frames), and the like. The error detection engine checks for errors in the compressed data stream. The macroblock level information construction engine decompresses the data frames. The motion compensation and post processing engine performs motion compensation using motion vectors from the compressed data to improve the image quality. The motion compensation and post processing engine then typically outputs the final decoded display data into the memory. The video data is held in one or more buffers 170 during processing by the video stream syntax parser engine and error detection engine, the macroblock level information construction engine, and the motion compensation and post processing engine. Operation of the video decoder will be further explained with references to FIGS. 2-5.

Figure 2:
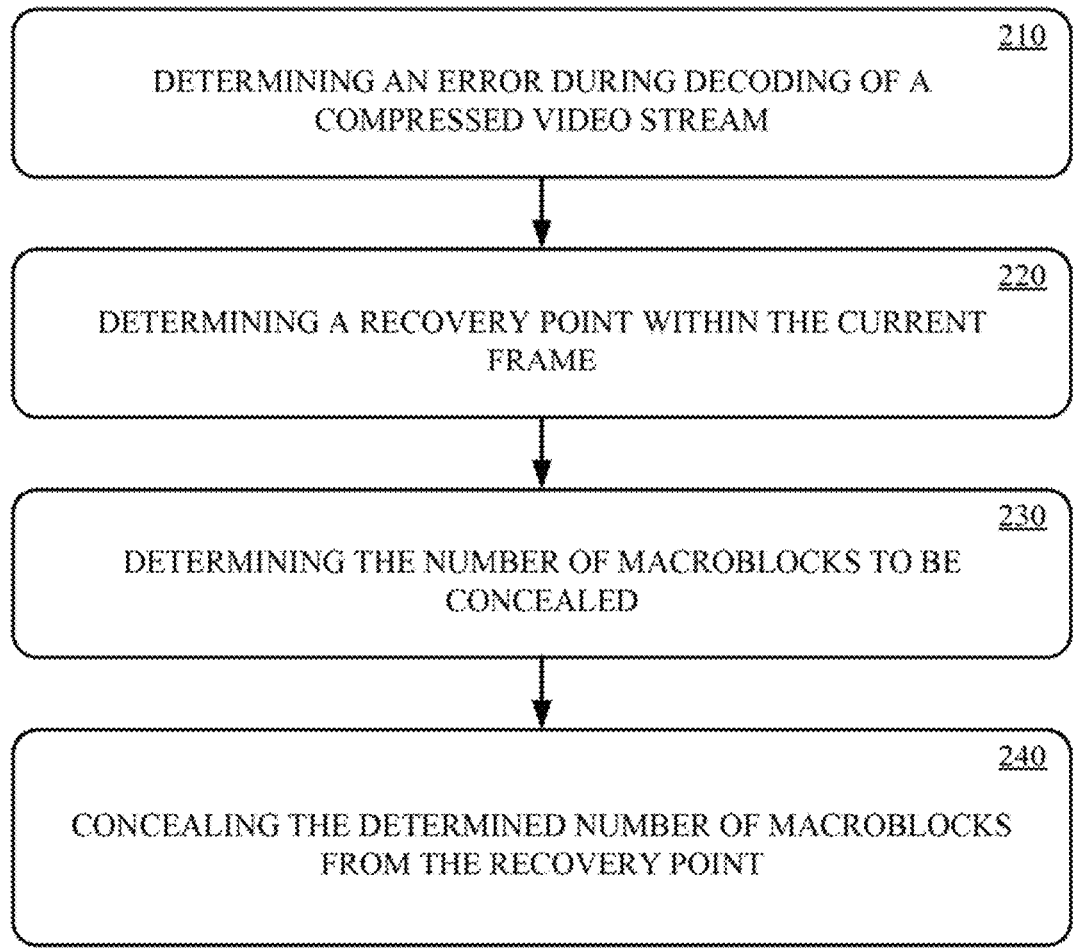
FIG. 2 shows a flow diagram of a method of concealing errors during decoding of a compressed video stream, in accordance with one embodiment of the present technology.
Figure 3:
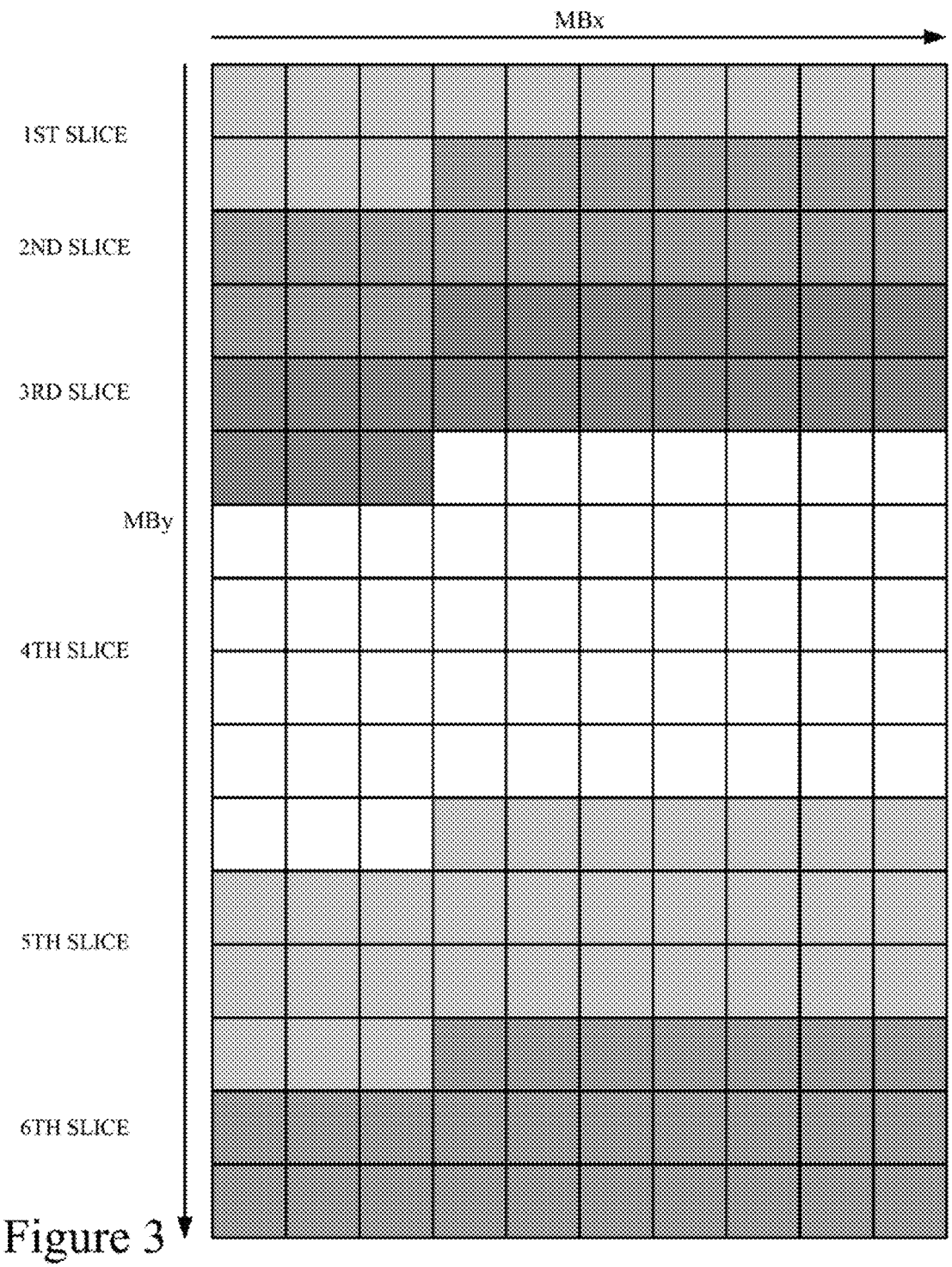
FIG. 3 shows an exemplary frame of macroblocks of a video stream, in accordance with one embodiment of the present technology.

Referring now to FIG. 2, a method of concealing errors during decoding of a compressed video stream, in accordance with one embodiment of the present technology, is shown. In one implementation, the video stream is compressed according to the Motion Picture Experts Group (MPEG) standard. The method of error concealment includes identifying where recovery of the current image can start and identifying how many macroblocks need to be concealed. The method may begin with determining an error during decoding of a compressed video stream, at 210. In one implementation, the hardware of the video stream syntax parser engine and error detection engine detects an error during parsing the syntax of the video stream. At 220, a recovery point within the current image frame is determined. In one implementation, the next logical synchronization point for an MPEG video stream is the following slice of a frame. As illustrated in FIG. 3, the exemplary frame is ten macroblocks wide (MBx, where x= (0 . . . 9)) and sixteen macroblocks long (MBy, where y= (0 . . . 15). A first slice, for example, starts at MBx=0 and MBy=0 and ends at MBx=2 and MBy=1. A second slice starts at MBx=3 and MBy=1 and ends at MBx=2 and MBy=3. A third slice starts at MBx=3 and MBy=3 and ends at MBx=2 and MBy=5. While decoding, if an error is detected during processing of MBx=3 and MBy=0 in the first slice, the hardware syntax parser engine and error detection engine determines the next good slice. The next good slice may for example start at MBx=3 and MBy=0, which is the second slice.

Generally, information in the current slice beyond where the error occurs is not recoverable. Therefore, when an error is identified by the syntax parser engine of the hardware, the error detection engine will try to find the next good slice. In MPEG, there is a unique start code that is associated with every slice. The syntax parser engine, therefore, searches for the next slice start code and synchronizes to the next slice. Once synchronized to the next good slice, the syntax parser engine and/or error detection engine processes several more bytes of data in the next slice to identify the horizontal and vertical position of the first macroblock in the next slice. If there is an error detected while identifying the horizontal and vertical position of the first macroblock in the next slice, the syntax parser engine and error detection engine again searches for the next slice start code until a next good slice is identified and the horizontal and vertical position of the first macroblock in the next good slice is identified.

At 230, the number of macroblocks to be concealed is determined. In one implementation, the syntax parser engine and/or error detection engine computes the number of macroblocks to be concealed after identifying the next good slice. In one implementation, the syntax decode engine inspects the horizontal and vertical position of the new slice and compares it to the macroblock position where the error occurred. If the new macroblock position is less than the macroblock position where the error occurred, then the syntax decode engine concludes that the new slice is probably a slice belonging to the next picture and hence infers that no slices from the current frame can be recovered. In such a condition, the syntax engine issues a command to conceal the remaining portion of the current frame. If the new macroblock position is in the current picture frame, the engine computes the difference between the macroblock position of where the error was detected and the macroblock position where the new slice begins to determine the number of macroblocks to be concealed.

At 240, the determined number of macroblocks may be concealed from the recovery point. In one implementation, the syntax parser engine and/or error detection engine provides the necessary commands and/or control signals based upon the number of macroblocks to be concealed to the other hardware functional units down the pipe to execute concealment commands. When an error in the bitstream occurs, the error may not be identified at an accurate macroblock position. It may take a few macroblocks of erroneous data to be processed before an error is identified. Therefore, in one implementation, the hardware decoder may start concealment starting from a predetermined number (N) of macroblocks before the position where the error was identified. In one implementation, the predetermined number of macroblock may be programmed by a video decoder driver, utility or similar software routine. The syntax parser engine makes sure that when it rewinds back the predetermined number of macroblocks from where the error was detected, it does not step into a previous slice. For example, if the error was detected in the middle of the second slice of a frame, and rewinding N macroblock for concealment means stepping into the first slice, then the syntax parser engine starts concealment from the beginning of the second slice. The hardware processing may support one or more schemes of concealment. In one implementation, the hardware processing may implement a concealment scheme that includes copying picture data from the reference frame for the erroneous macroblocks.

Although the concealment may be performed by the hardware processing, the architecture is flexible and enables concealment to be handed off to be performed by the software processing. This flexibility may be realized by the syntax parser engine keeping a count of the number of macroblocks to be concealed and then letting the software driver know how many macroblocks to conceal at the end of each frame. Software can read the value of the number of macroblock to be concealed and optionally decide to process the frame differently. In software assisted error concealment mode, the software can use a different error concealment algorithm.

The decode time is advantageously reduced because each time an error occurs, a resynchronization to the next good slice is done automatically by the syntax parsing engine and error detection engine in the decoder hardware. Software is not interrupted for resynchronization in response to error detection. The decode time is also advantageously reduced because the syntax parser engine and error detection engine automatically calculates the number of macroblocks to be concealed and issues commands and/or control signals to the other functional blocks within the decoder hardware to conceal the identified macroblocks. This also reduces the amount of work performed by software processing as well as the latency associated with it.

Figure 4:
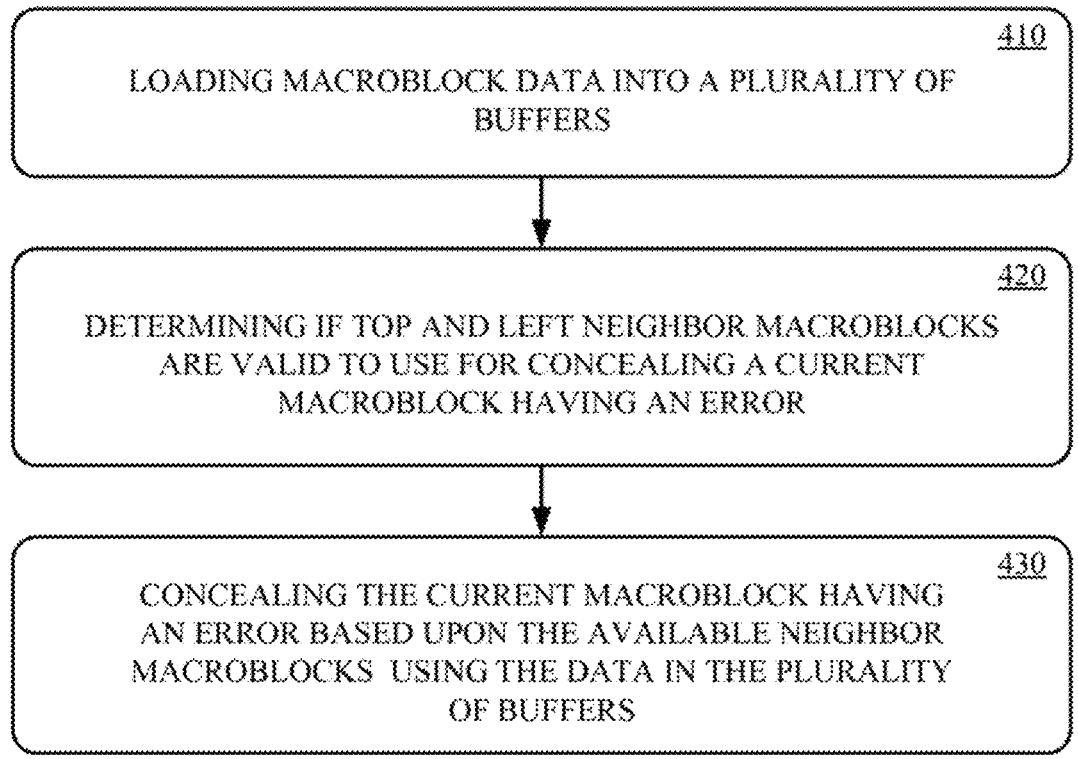
FIG. 4 shows a flow diagram of a method of concealing errors during decoding of a compressed video stream, in accordance with another embodiment of the present technology.

Referring now to FIG. 4, a method of concealing errors during decoding of a compressed video stream, in accordance with another embodiment of the present technology, is shown. The method begins with loading macroblock data into a plurality of buffers in response to one or more macroblock concealment instructions and/or control signals, at 410. In one implementation, the plurality of buffers includes a row buffer and a column buffer for each pixel component (e.g., one luma and two chroma components). The macroblock row buffer may include ping and pong portions. The depth of each of the ping and pong portions may be the number of pixel in a macroblock row and each entry in the buffer may be 1 byte. The depth of the macroblock column buffer may be a macroblock height, which is typically 16 for luma component and 8 for chroma component, deep with each entry being 1 byte. The last macroblock column is stored in the macroblock column buffer data in response to one or more macroblock concealment instructions. At substantially the same time, the last row of pixels in the current macroblock is stored in the applicable one of either the ping or pong portion of the row buffer. In one implementation, the macroblock row buffer may be setup such that the ping portion is used for all odd rows and the pong portion is used for all even rows, or vice-versa.

At 420, it is determined if the top and left neighbor macroblocks of a current macroblock are valid to use for concealing a current macroblock having an error. In one implementation, the macroblock level information construction engine determines if the top and bottom neighbor macroblock are valid. In one implementation, if the error macroblock is the first macroblock in a frame, then the current macroblock does not have a valid neighbor macroblock. If the error macroblock is in the first row of a frame and it is not the first macroblock in the row, then the macroblock will not have top neighboring macroblocks to use for concealment. If the error macroblock is in the first row of a frame and it is not the first macroblock in the row, the left neighbor macroblock may be used to conceal the current macroblock having an error. The data for the left neighbor macroblock, in one implementation, is in the column buffer. If the error macroblock is not in the first row, then it will have top neighbor macroblocks to use for concealment. The data for the top neighbor macroblock, in one implementation, is in the row buffer. Also, if the error macroblock is not the first macroblock and is not in the first row, then it will have left neighbor macroblock to use for concealment. The data for the left neighbor macroblock, in one implementation, is in the column buffer.

Figure 5:
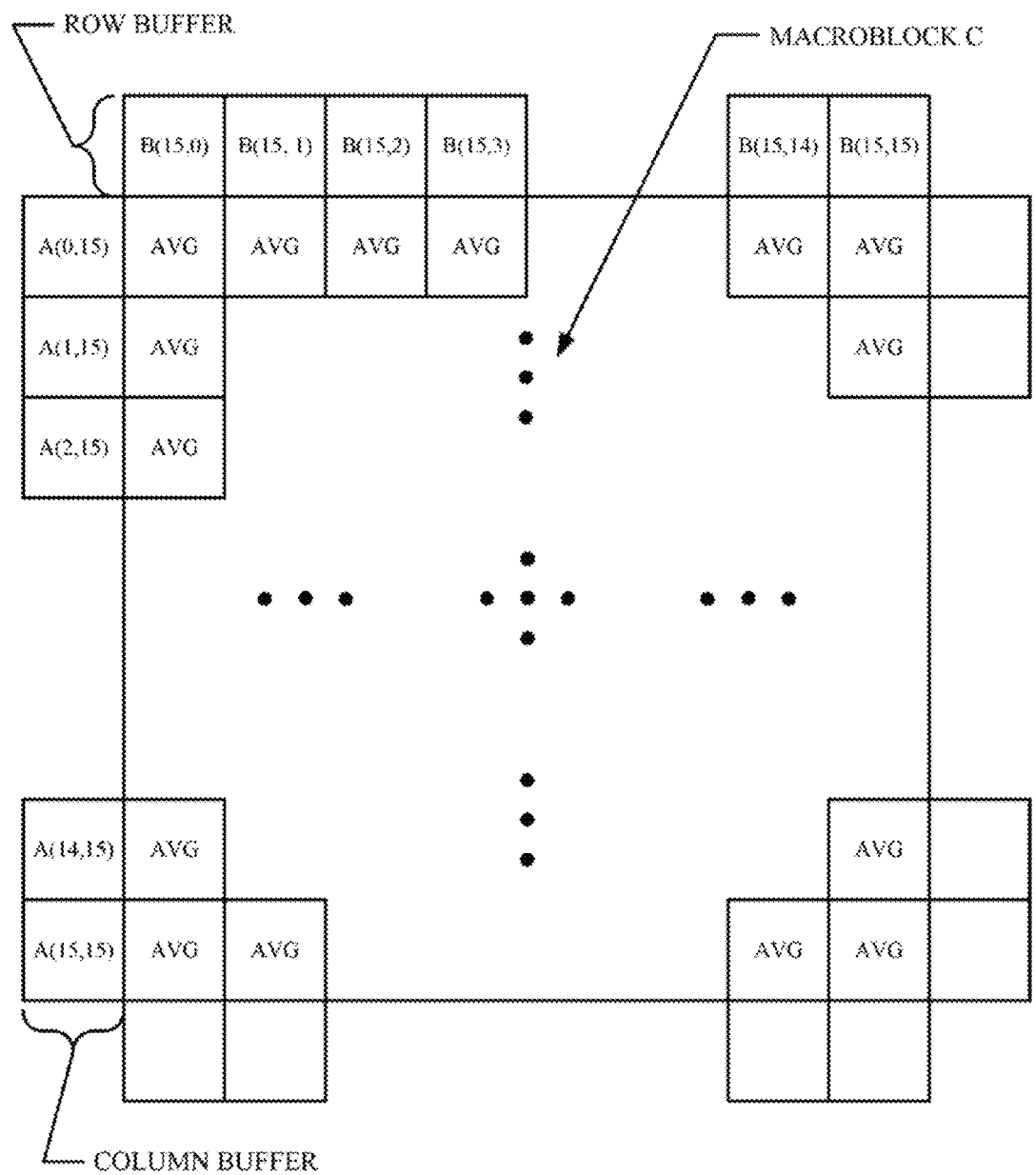
FIG. 5 shows a concealed macroblock, in accordance with one embodiment of the present technology.
Figure 6:
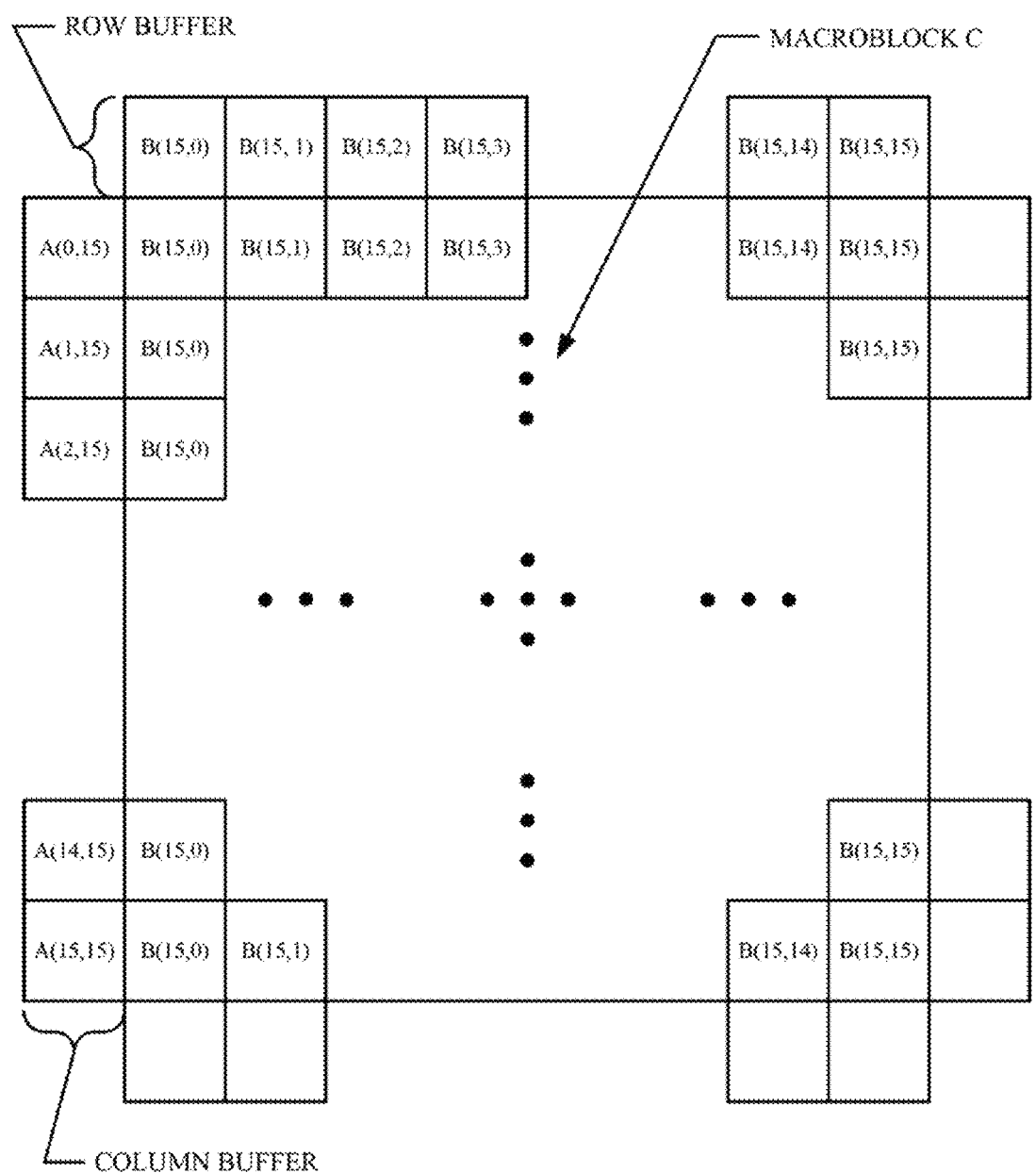
FIG. 6 shows a concealed macroblock, in accordance with another embodiment of the present technology.
Figure 7:
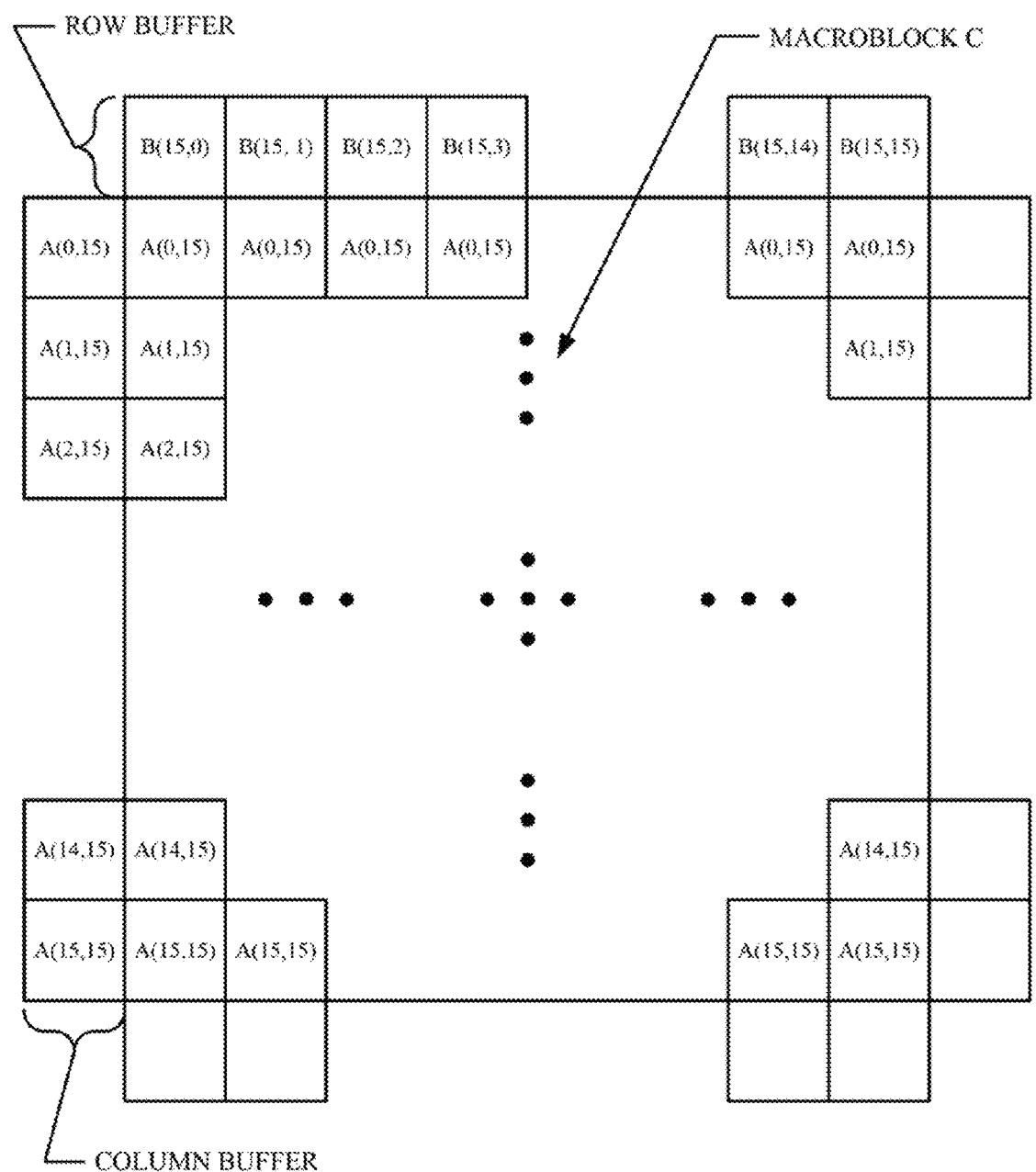
FIG. 7 shows a concealed macroblock, in accordance with yet another embodiment of the present technology.

At 430, the macroblock having an error is concealed based upon the valid neighbor macroblocks available for concealment. In one implementation, if the current macroblock does not have a valid neighbor of macroblock data then the pixels of the current macroblock may be filled by the macroblock level information construction engine with a predetermined value such as 128. If the current macroblock has valid top and left neighbor macroblock data, then the current macroblock having an error can be concealed by the macroblock level information construction engine in one of the following three implementations. In a first implementation, the pixel data in the column and row buffers is averaged and each pixel in the macroblock having an error is filled with this average value as illustrated in FIG. 5. In one implementation, the pixel values in erroneous macroblock C are filled with the average of the column buffer holding the left macroblock A and the row buffer holding the top macroblock B. In a second implementation, the macroblock data for the top neighbor in the row buffer is replicated to fill each row of pixels in the current macroblock having an error as illustrated in FIG. 6. In a third implementation, the macroblock data for the left neighbor in the column buffer is replicated to fill each column of pixels in the current macroblock having an error as illustrated in FIG. 7. In one implementation, if the current macroblock only has valid macroblock data for the top neighbor, the top neighbor macroblock data in the row buffer is replicated to fill each row of pixels in the current macroblock having an error. Similarly, if the current macroblock only has valid macroblock data for the left neighbor, the left neighbor macroblock data in the column buffer is replicated to fill each column of pixels in the current macroblock having an error.

Figure 8A:
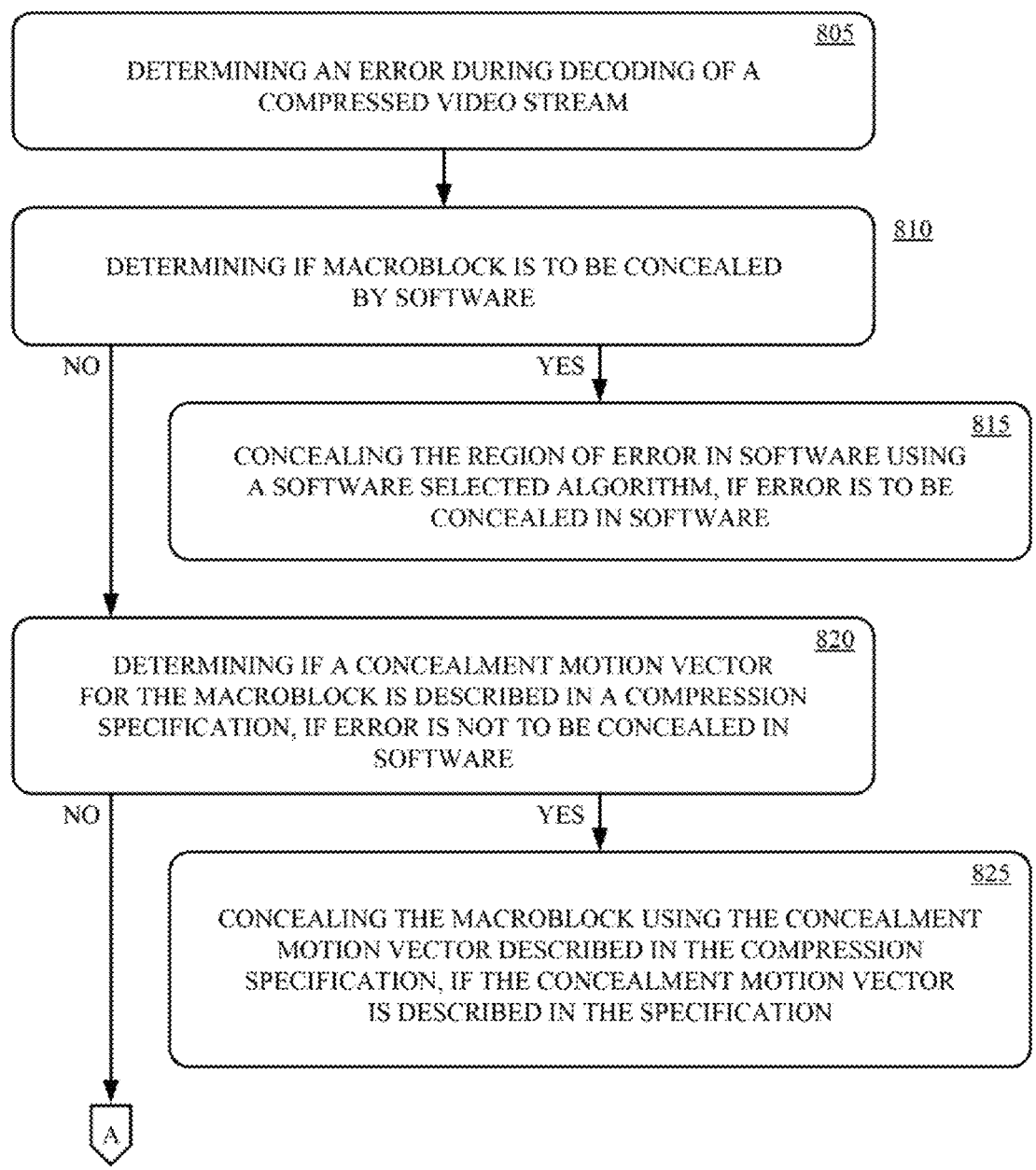
FIGS. 8A-8C show a flow diagram of a method of concealing errors during decoding of a compressed video stream, in accordance with yet another embodiment of the present technology.
Figure 8B:
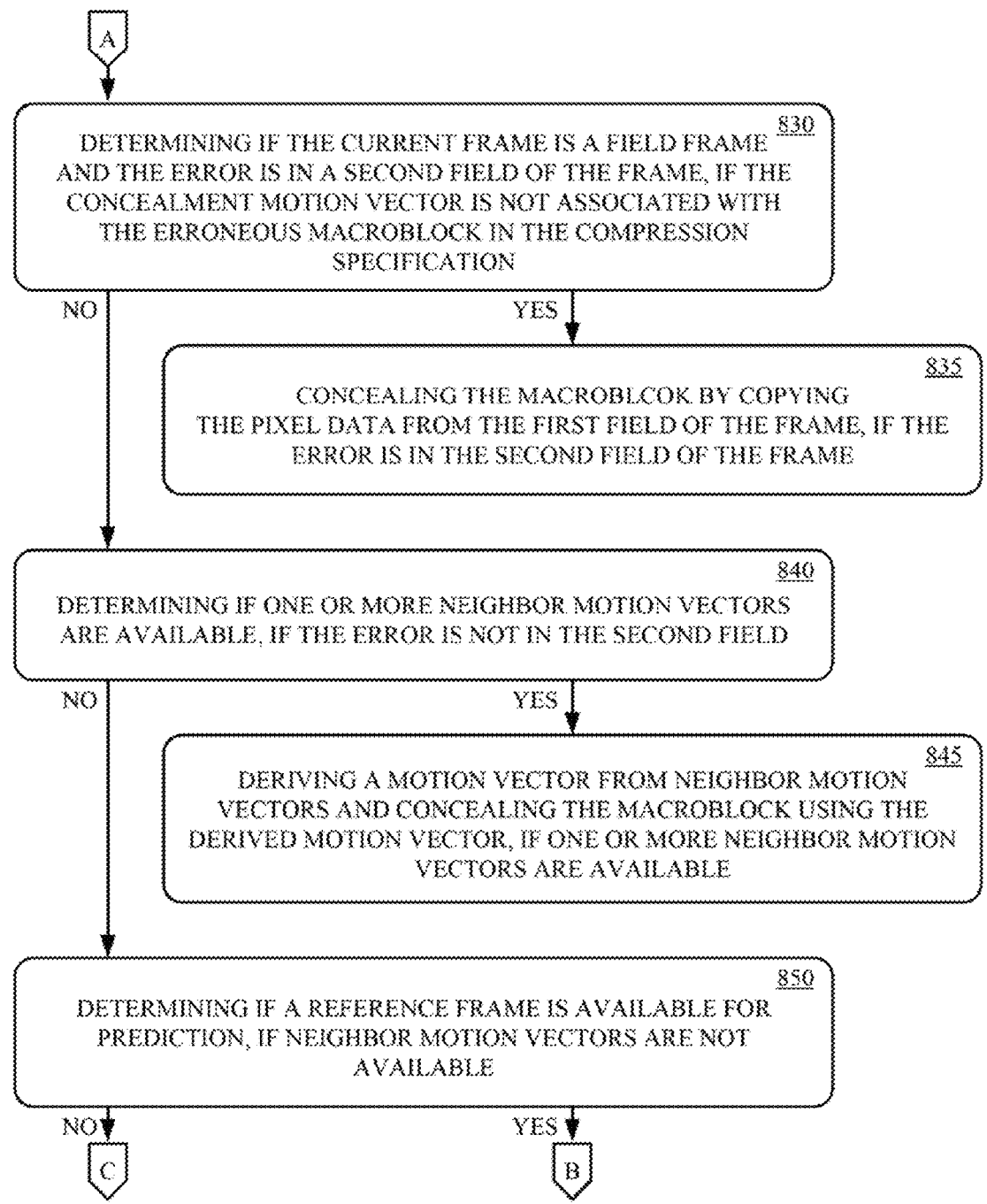
Figure 8C:
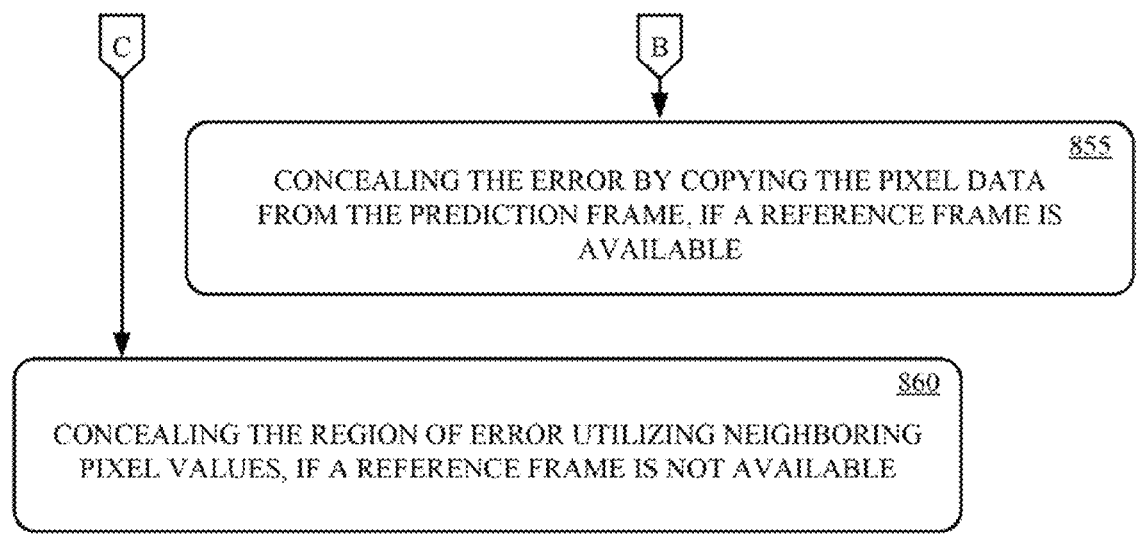

Referring now to FIGS. 8A-8C, a method of error concealment for a compressed video stream, in accordance with one embodiment of the present technology, is shown. The method may begin with determining an error during decoding of a compressed video stream, at 805. The occurrence of an error in a macroblock may be determined by the video stream syntax parser engine and error detection engine. If an error is detected, it is determined if the error is to be concealed by a software driver, utility, routine or the like, at 810. The syntax parser engine and error detection engine or software driver, utility, routine or the like may determine if the error is to be concealed by a software driver, utility, routine or the like. At 815, the pixel data associated with the macroblock having an error is concealed by the software driver using a selected algorithm, if it is determined that the software driver is to be used. The software driver, utility, routine or the like may select any applicable software based macroblock error concealment algorithm. In one implementation, the software driver, utility, routine or the like may program the syntax parser engine and error detection engine with the values with which the macroblock can be concealed.

At 820, if the error is not to be concealed by the software driver, it is determined if a concealment motion vector for the macroblock error is described in the compression specification. In one implementation, the syntax parser engine and error detection engine may determine if a concealment motion vector for the macroblock error is described in the compression specification. At 825, the macroblock having an error is concealed using the concealment motion vector described in the compression specification, if a concealment motion vector is associated with the error macroblock. In one implementation, the macroblock level information construction engine may conceal the macroblock utilizing the concealment motion vector described in the compression specification.

At 830, if a concealment motion vector is not associated with the error macroblock in the compression specification, it is determined if the current picture frame is a field and the error is in the second field of the frame. In one implementation, the syntax parser engine and error detection engine determines if the current picture frame is a field picture and the error is in the second field of the frame. At 835, the macroblock containing an error is concealed by copying the pixel data from the first field of the frame, if the error is in the second field of the frame. In one implementation, the macroblock level information construction engine copies the pixel data in the first field of the frame into the corresponding location in the second field. Copying the pixels from the first field is the equivalent to setting the motion vector to (0,0).

At 840, if the error is not in the second field of the frame, it is determined if one or more neighboring motion vectors are available. In one implementation, the syntax parser engine and error detection engine determines if the neighboring motion vectors are available. At 845, a motion vector is derived from neighboring motion vectors if one or more neighboring motion vectors are available. The pixel data for the macroblock having an error is then concealed by copying the pixel data pointed to by the derived motion vector. In one implementation, the macroblock level information construction engine derives the motion vector for the current macroblock from the neighboring motion vectors. The macroblock level information construction engine then copies the pixel data from the macroblock pointed to by the derived motion vector.

When concealing the macroblock having an error, based upon the neighboring motion vectors, the hardware accesses the left, top and top right motion vectors relative to the macroblock being concealed. In one implementation, a motion vector row buffer is utilized. Entries in the macroblock motion vector row buffer hold the corresponding left, top and top right motion vectors related the macroblock to be concealed. Each time a macroblock is concealed, the macroblock row buffer is updated with the current value of the neighbor macroblock motion vectors. In one implementation, the motion vector row buffer may have ping and pong portions. The ping portion of the buffer may hold corresponding motion vectors for odd rows of macroblocks and the pong portion may hold corresponding motion vector for the even rows. Accordingly, when a macroblock error is determined and the current macroblock is in the ping portion of the buffer, the left neighbor motion vector is also in the ping portion of the buffer while the top and top right neighbors are in the pong portion. Similarly, when a macroblock error is determined and the current macroblock is in the pong portion of the buffer, the left neighbor motion vector is also in the pong portion of the buffer while the top and top right neighbors are in the ping portion.

Figure 9:
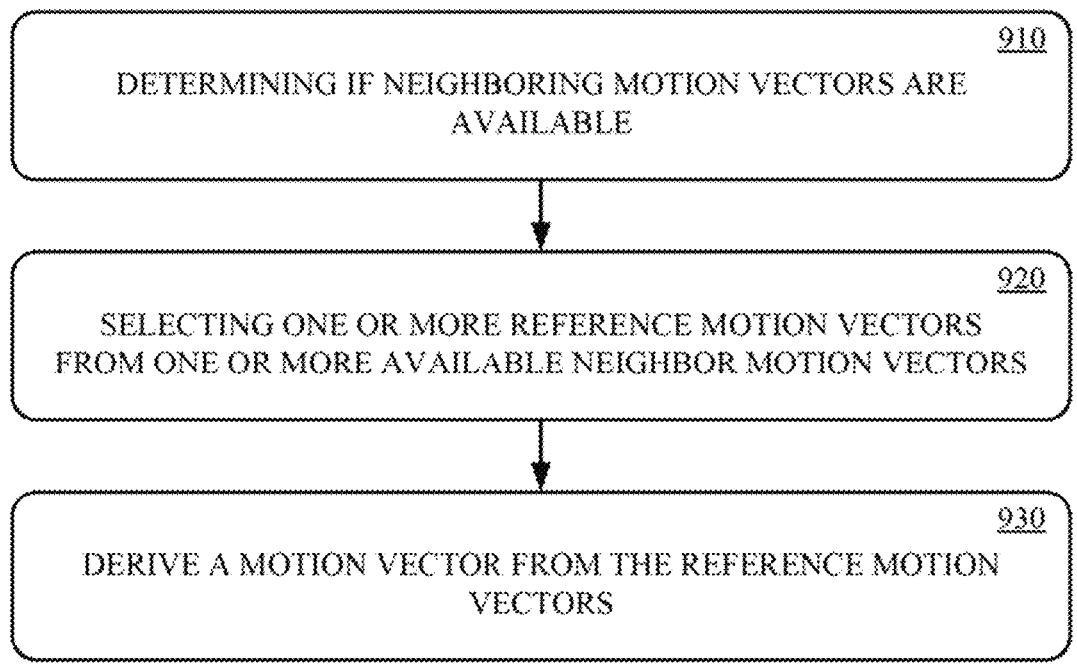
FIG. 9 shows a flow diagram of a method of deriving a concealment motion vector if the neighboring motion vectors are available, in accordance with one embodiment of the present technology.

Referring now to FIG. 9, a method of deriving a concealment motion vector if the neighboring motion vectors are available, in accordance with one embodiment of the present technology, is shown. The method begins with determining if the neighboring motion vectors are available, at 910. The neighbor is considered available when a neighbor exists relative to the error macroblock, the neighbor is an Inter macroblock, and the neighbor has a forward motion vector. Once the available neighbor motion vectors are determined, a reference motion vector is selected from one or more of the available neighbor motion vectors, at 920. In one implementation, if only one motion vector exists in the forward direction, then the available motion vector in the forward direction is chosen as a reference motion vector. If two motion vectors are in the forward direction, then the first motion vector is chosen as a reference motion vector. In the case of neighbors that have dual-prime motion compensation, the encoded motion vector is used as a reference motion vector and the differential motion vector is dropped. Once the reference motion vectors are identified, a motion vector is derived from the reference motion vectors, at 930. In one implementation, if there are three reference motion vectors, then the median of the three reference motion vectors may be utilized as the derived motion vector for the erroneous macroblock. If there are two reference motion vectors, then the average of the reference motion vectors may be utilized as the derived motion vector for the erroneous macroblock. If there is one reference motion vector, then the given one reference motion vector may be utilized as the derived motion vector for the erroneous macroblock.

The method of deriving the motion vector if the neighboring motion vectors are available may be advantageously utilized to conceal a non-decodable macroblock. The technique also advantageously reduces involvement of software processing when an error in decoding a macroblock is encountered.

Referring again to FIG. 8B, if the neighboring motion vectors are not available, it is determine if a reference frame is available for prediction, at 850. In one implementation the syntax parser engine and error detection engine determines if a reference picture is available for prediction. At 855, the error is concealed by copying the pixel data from the same region in the prediction frame to the error position in the current frame, if a reference frame is available. Copying the pixels from the same position in the prediction frame is the equivalent to setting the motion vector to (0,0). In one implementation, the macroblock level information construction engine copies the pixel data from the prediction frame to the current frame. At 860, if a reference picture is not available, then the macroblock having an error is concealed utilizing neighboring pixels. In one implementation, the macroblock level information construction engine utilizes the neighboring pixels to conceal the pixel data for the macroblock having an error.

Embodiments of the present technology advantageously provide techniques for concealing decoding errors in hardware. The embodiments reduce the interrupt based handling of concealment. Therefore, embodiments of the present technology may advantageously enable decoding of video stream data at a desired minimum frame rate higher than can be achieved by software based error concealment techniques.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:

determining an error during decoding video data;

determining a recovery point within a current frame when an error is determined;

determining a number of macroblocks to be concealed; and concealing the determined number of macroblocks from the determined recovery point, including:

loading macroblock data into a plurality of buffers;

determining if a top neighbor macroblock and a left neighbor macroblock of a current macroblock are valid to use for concealing the current macroblock having an error; and concealing the current macroblock having the error based upon the available neighbor macroblocks using the data in the plurality of buffers, wherein;

the current macroblock does not have a valid top neighbor macroblock or valid left neighbor macroblock if the current macroblock is the first macroblock of the frame;

the current macroblock having an error is concealed with a predetermined value when the current macroblock does not have a valid top neighbor macroblock or valid left neighbor macroblock;

the current macroblock has a valid left neighbor macroblock if the current macroblock is in the first row of the frame and is not the first macroblock in the first row;

the current macroblock has a valid too neighbor macroblock and a valid left neighbor macroblock if the current macroblock is not in the first row of the frame and is not the first macroblock in the row;

the current macroblock having an error is concealed using data in the top neighbor macroblock, if the current macroblock has a valid top neighbor macroblock and not a valid left neighbor macroblock, by replicating data in a row buffer storing pixel values from the top neighbor macroblock to fill each row of the current macroblock;

the current macroblock having an error is concealed using data in the left neighbor macroblock, if the current macroblock has a valid left neighbor macroblock and not a valid top neighbor macroblock, by replicating data in a column buffer storing pixel values from the right neighbor macroblock to fill each column of the current macroblock;

the current macroblock having an error is concealed using an average of a column buffer storing pixel values from the right neighbor macroblock to fill each pixel of the current macroblock if the current macroblock has a valid left neighbor macroblock and a valid top neighbor macroblock;

the current macroblock having an error is concealed by replicating data in a row buffer storing pixel values from the top neighbor macroblock to fill each row of the current macroblock if the current macroblock has a valid left neighbor macroblock and a valid top neighbor macroblock; and the current macroblock having an error is concealed by replicating data in a column buffer storing pixel values from the left neighbor macroblock to fill each column of the current macroblock if the current macroblock has a valid left neighbor macroblock and a valid top neighbor macroblock.

2. The method according to claim 1, wherein determining the recovery point comprises determining a next good slice of a frame of the video data after a slice of the frame containing the determined error.

3. The method according to claim 2, wherein determining a slice comprises determining a horizontal and a vertical position of a first macroblock in the slice.

4. The method according to claim 3, wherein the number of macroblocks to be concealed includes a predetermined number of macroblocks before a position of the error.

5. The method according to claim 1, wherein the plurality of buffers comprise:

a row buffer storing pixel values from the top neighbor macroblock including a ping portion and a pong portion, and wherein a last row of pixel values macroblocks is alternatively loaded into the ping or pong portion of the row buffer; and a column buffer storing pixel values from the left neighbor macroblock.

6. A method comprising:
determining an error during decoding video data;
determining a recovery point within a current frame when an error is determined;
determining a number of macroblocks to be concealed; and
concealing the determined number of macroblocks from the determined recovery point, wherein concealing the determined number of macroblocks from the determined recovery point includes:
determining if a macroblock is to be concealed by software for the macroblock determined to include an error;
concealing the macroblock determined to include an error, in software with a predetermined value, if the error is to be concealed in software;
determining if a concealment motion vector for the macroblock determined to include an error is described in a compression specification, if the error is not to be concealed in software;
concealing the macroblock determined to include an error, using the concealment motion vector described in the compression specification, if the concealment motion vector is described in the specification;
determining if the current frame is a field frame and the error is in a second field of the frame, if the concealment motion vector is not described in the specification;
concealing the macroblock determined to include an error, by copying pixel data from the first field of the frame, if the error is in the second field of the frame;
determining if one or more neighbor motion vectors are available, if the error is not in the second field of the frame;
deriving a motion vector from the one or more available neighbor motion vectors, if one or more neighbor motion vectors are available;
concealing the macroblock determined to include an error, using the derived motion vector, if the one or more neighbor motion vectors are available;
determining if a reference frame is available for prediction, if the one or more neighbor motion vectors are not available;
concealing the macroblock determined to include an error, by copying pixel data from a same region in the prediction frame, if the reference frame is available for prediction; and
concealing the macroblock determined to include an error, utilizing neighboring pixel values, if the reference frame is not available for prediction.

7. The method according to claim 6, wherein the motion vector is concealed in software with a value selected by the software, if the error is to be concealed in the software.

8. The method according to claim 6, further comprising:
selecting one or more reference motion vectors from the one or more available neighbor motion vectors, wherein one or more neighbor motion vectors are available when a motion vector of a neighbor macroblock exists relative to the macroblock determined to include an error, the neighbor macroblock is an Inter macroblock frame, and the neighbor macroblock has a forward motion vector; and
deriving the motion vector from the one or more reference motion vectors including
a motion vector in the forward direction, when there is a single neighbor motion vector in the forward direction;

a first motion vector in the forward direction, when there is a plurality of neighbor motion vector in the forward direction; and an encoded motion vector, when a plurality of neighbor motion vectors have dual-prime motion compensation wherein the derived motion vector comprises a median of the reference motion vectors when there are three or more reference motion vectors;

an average of the reference motion vectors when there are two reference motion vectors; and the reference motion vector when there is a single reference motion vector.

9. A system comprising:

a hardware error detection engine to detect an error during decoding a current frame of video data and determine a number of macroblocks to be concealed;

a hardware syntax parser engine, communicatively coupled to the hardware error detection engine, to determine a recovery point with the current frame when an error is detected and to determine if a top neighbor macroblock and a left neighbor macroblock of a current macroblock are valid to use for concealing the current macroblock having an error, wherein the current macroblock does not have a valid top neighbor macroblock or valid left neighbor macroblock if the current macroblock is the first macroblock of the frame;

the current macroblock has a valid left neighbor macroblock if the current macroblock is in the first row of the frame and is not the first macroblock in the first row; and the current macroblock has a valid top neighbor macroblock and a valid left neighbor macroblock if the current macroblock is not in the first row of the frame and is not the first macroblock in the row; and a hardware macroblock level information construction engine, communicatively coupled to the hardware error detection engine and hardware syntax parser engine, to conceal the current macroblock having the error based upon the available neighbor macroblocks for the number of macroblocks from the recovery point.

10. The system of claim 9, wherein the number of macroblocks to be concealed includes a number of macroblocks containing an error and a predetermined number of macroblocks before the one or more macroblocks containing errors.

11. The system of claim 10, wherein the recovery point comprises a next good slice of macroblocks after a slice of macroblocks where the error is detected.

12. The system of claim 11, wherein a macroblock comprises a motion vector.

13. A system comprising:

a hardware error detection engine to detect an error during decoding a current frame of video data and determine a number of macroblocks to be concealed;

a hardware syntax parser engine, communicatively coupled to the hardware error detection engine, to determine a recovery point with the current frame when an error is detected, to determine if a macroblock is to be concealed by software for the macroblock determined to include an error, to determine if a concealment motion vector for the macroblock determined to include an error is described in a compression specification if the error is not to be concealed in software, to determine if the current frame is a field frame and the error is in a second field of the frame if the concealment motion vector is not described in the specification, to determine if one or more neighbor motion vectors are available if the error is not in the second field of the frame, and to determine if a reference frame is available for prediction, if the one or more neighbor motion vectors are not available; and a hardware macroblock level information construction engine, communicatively coupled to the hardware error detection engine and hardware syntax parser engine, to conceal the number of macroblocks from the recovery point wherein the hardware macroblock level information construction engine sequentially select a concealment method selected from a group consisting of concealing the macroblock determined to include an error in software with a predetermined value if the error is to be concealed in software, concealing the macroblock using the concealment motion vector described in the compression specification if the concealment motion vector is described in the specification, concealing the macroblock by copying pixel data from the first field of the frame if the error is in the second field of the frame, deriving a motion vector from the one or more available neighbor motion vectors and concealing the macroblock using the derived motion vector if the one or more neighbor motion vectors are available, concealing the macroblock by copying pixel data from a same region in the prediction frame if the reference frame is available for prediction and concealing the macroblock utilizing neighboring pixel values if the reference frame is not available for prediction.

14. The system of claim 13, further comprising:

a buffer storing motion vectors of a plurality of neighbor macroblocks of the macroblock determined to include an error, wherein the buffer includes a pong portion that holds motion vectors for odd rows of motion vectors and a ping portion that holds motion vectors for even rows of motion vectors.

15. The system of claim 14, wherein the one or more available neighbor motion vectors are determined from the plurality of neighbor macroblocks stored in the buffer.

16. The system of claim 14, wherein the motion vector is derived from one or more available neighbor motion vectors stored in the buffer.

* * * * *